(12) United States Patent
Slassi

(10) Patent No.: US 6,435,416 B1
(45) Date of Patent: Aug. 20, 2002

(54) METHOD OF AUTHENTICATING A PERSONAL CODE OF A USER OF AN INTEGRATED CIRCUIT CARD

(75) Inventor: Tarik Slassi, Paris (FR)

(73) Assignee: Schlumberger Systémes, Montrouge (FR)

(*) Notice: Subject to any disclaimer, the term of this patent is extended or adjusted under 35 U.S.C. 154(b) by 0 days.

(21) Appl. No.: 09/717,324

(22) Filed: Nov. 20, 2000

(30) Foreign Application Priority Data

May 20, 1998 (FR) ............................................. 98 06395

(51) Int. Cl.7 .................... G06K 19/06; G06K 5/00; G06F 17/60
(52) U.S. Cl. .................. 235/492; 235/380; 235/379
(58) Field of Search ................... 235/492, 380, 235/379, 381, 375, 382; 705/72, 39, 43, 44

(56) References Cited

U.S. PATENT DOCUMENTS

| | | | |
|---|---|---|---|
| 4,630,201 A | * 12/1986 | White | 364/408 |
| 5,521,362 A | * 5/1996 | Powers | 235/380 |
| 5,721,781 A | * 2/1998 | Deo et al. | 380/25 |
| 5,796,832 A | * 8/1998 | Kawan | 380/24 |

FOREIGN PATENT DOCUMENTS

| | | |
|---|---|---|
| DE | 195 27 715 | 2/1997 |
| EP | 0 587 375 | 3/1994 |
| EP | 0 596 276 | 5/1994 |
| EP | 0 763 791 | 3/1997 |
| IE | 960 815 | 11/1997 |

* cited by examiner

Primary Examiner—Karl D. Frech
Assistant Examiner—April A. Nowlin
(74) Attorney, Agent, or Firm—Cohen, Pontani, Lieberman & Pavane

(57) ABSTRACT

A method of authenticating a personal code of a user of an integrated circuit card received in a reader fitted with a keypad, connected to a computer, and capable of accepting at least one type of card. Formatting instructions are transmitted from the computer to the reader that correspond to the type of the card. A command is sent for authenticating the personal code and the authentication command is verified in the reader. For a qualified authentication command, the reader is put into a secure mode which blocks anyone with fraudulent intentions from intervening in the procedure to obtain the personal code. The personal code is then inputted via the keypad of the reader, formatted for the particular type of card used, and the formatted code and the command for authenticating it are transmitted from the reader to the integrated circuit of the card. The card compares the formatted code with a pre-stored personal code.

9 Claims, 1 Drawing Sheet

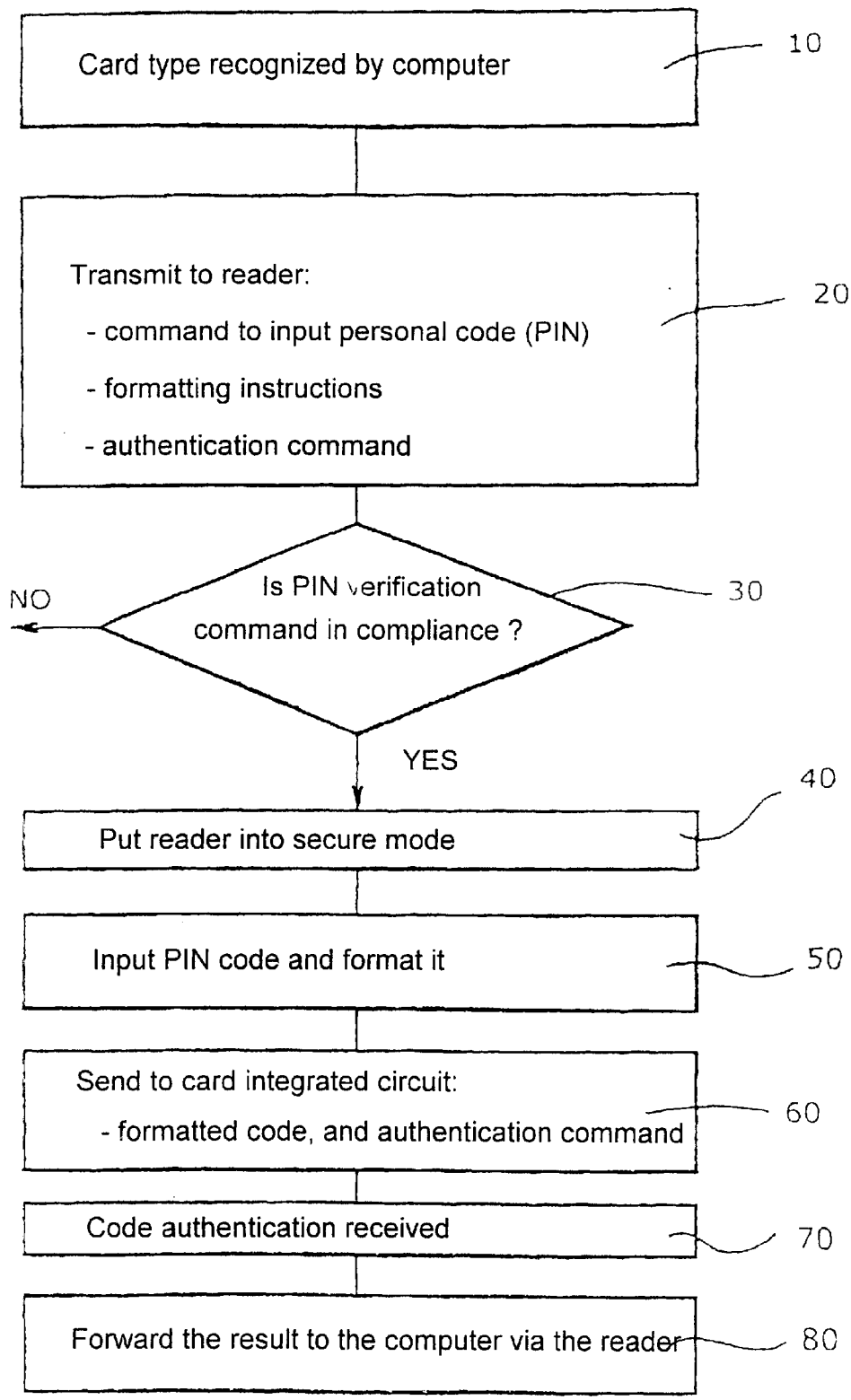

METHOD OF AUTHENTICATING A PERSONAL CODE OF A USER OF AN INTEGRATED CIRCUIT CARD

FIELD OF THE INVENTION

The present invention relates to a method of authenticating the personal code of a user of an integrated circuit card such as a bank card, e.g. during payment operations performed using a computer connected to a network.

BACKGROUND OF THE INVENTION

To perform such operations, it is common practice to use an integrated circuit card reader connected to the serial port of the computer so as to form a simple interface between the computer and the integrated circuit of the card.

Methods presently in use for authenticating a personal code (also known as a personal identification number, or PIN) include the steps of inputting the code via the computer keyboard, converting the inputted personal code into a format that is intelligible for the integrated circuit of the card, then transmitting the formatted personal code together with a command that the code be authenticated to the reader which forwards them, in turn, to the integrated circuit of the card which then authenticates the received personal code using the user's personal code as pre-stored in the integrated circuit. When the user inputs the personal code, a person with fraudulent intentions, referred to herein as an attacker, might be capable of obtaining the personal code by accessing the computer memory in which the inputted personal code is stored prior to being forwarded to the reader, where such access could be direct or over a network. The attacker could also obtain the personal code by causing an instruction to be sent to the integrated circuit of the card instead of the authentication command to store the personal code in a memory of the integrated circuit to which the attacker can subsequently gain access. The risk of fraud is thus significant with existing authentication methods. This risk is associated with using the keyboard of the computer for inputting the personal code to be authenticated.

OBJECTS AND SUMMARY OF THE INVENTION

An object of the invention is to authenticate the personal code of an integrated circuit card user in a manner that maximizes protection of the personal code and that can be implemented using an integrated circuit card reader having electronic means that are relatively simple.

To achieve this and other objects of the invention, the integrated circuit card is received in a reader that is fitted with a keypad, connected to a computer, and capable of accepting at least one type of card. The type of card inserted in the reader is recognized. Formatting instructions are transmitted from the computer to the reader, with such instructions corresponding to the type of the card, and a command is sent for authenticating the personal code. The authentication command is verified in the reader and, for a qualified authentication command, the reader is put into a secure mode. The personal code is inputted via the keypad of the reader and formatted in accordance with the formatting instructions. The formatted code and the command for authenticating it are transmitted from the reader to the integrated circuit of the card.

Thus, the personal code can be inputted to the reader only after the authentication command for transmission to the integrated circuit of the card has been verified as being qualified and the reader has been put into a secure mode. It is then no longer possible to use the computer or a network to which it is connected to intervene in inputting the personal code.

Preferably, prior to inputting a personal code, the method of the present invention includes a step of informing the user that the reader is in a secure mode.

Preferably, subsequent to putting the reader in the secure mode, the method of the present invention includes a step of authorizing inputting of the personal code.

Advantageously, the secure mode prevents the execution of instructions that enable the computer to access the inputted personal code.

Preferably, simultaneously with the step of inputting and formatting the personal code, the method of the present invention includes a step of ensuring that any instruction coming from the computer during this step is compatible with keeping the reader in the secure mode.

Preferably, subsequent to transmitting the formatted personal code to the integrated circuit, the method of the present invention includes a step performed in the integrated circuit of the card, in which the received personal code is compared with the personal code of the user as pre-stored in the integrated circuit.

Preferably, the method of the present invention includes the step of transmitting the result of the comparison from the integrated circuit to the computer via the reader.

BRIEF DESCRIPTION OF THE DRAWING

The only accompanying drawing is a flow chart of operations performed in accordance with the invention.

DETAILED DESCRIPTION OF THE DRAWING

The method of the invention for authenticating a personal code of a user of an integrated circuit card is implemented from a reader designed to receive the integrated circuit card, the reader being fitted with a keypad and being connected to a computer. The computer can be connected to a local area network or a wide area network such as the Internet. The reader used can accept more than one type of card.

With reference to the drawing, step 10 recognizes the type of integrated circuit card received in the reader. Type recognition is performed by the computer in a well known manner, such as use of a data file in the card, details of which are not deemed necessary.

In a step 20, the computer then sends to the reader a command for inputting the personal code, formatting instructions for formatting the inputted personal code and a command for authenticating the code. The formatting instructions are defined as a function of the type of integrated circuit card and serve to make the personal code as inputted via the keypad of the reader intelligible for the integrated circuit. The command for authenticating the code is to be executed by the integrated circuit and, thus, likewise depends on the type of card. The formatting instructions and the authentication command can be implemented in the form of a reader type command. As is well known, protocols exist for communications between the reader and the computer with which a unique code is assigned for each type of command performable by the reader, known as reader type commands. When the reader receives one of these unique codes, it recognizes and executes the corresponding command.

On receiving the signals associated with step 20, the reader performs a step 30 of verifying compliance of the command for authenticating the inputted personal code. The purpose of this step is to ensure that the authentication command sent by the computer to the integrated circuit indeed qualifies as the command for verifying the received personal code (a command of the type VERIFY_PIN) and is not a command for storing the received personal code in a memory of the integrated circuit card to which it is possible to gain access via the computer or the network (e.g. a command of the UPDATE_RECORD type). This is a well known type of operation and, thus, details thereof are not deemed necessary.

If the command is not compliant, or qualified, then the exchange of information between the computer and the reader is interrupted, for example, and the user is informed via the display screen of the computer that it is not possible to secure inputting of the personal code.

If the authentication command is compliant, then during a step 40, the reader is put into a secure mode and the inputting of a personal code via the reader is authorized. Secure mode corresponds to a state of the reader in which all instructions issued by the computer to the reader are analyzed by the reader prior to being executed so that none of the instructions executed by the reader corresponds to an immediate or subsequent transfer of the input code to the computer or to any other device that is accessible to an attacker. Such instructions include, for example, an instruction commanding the reader to dump to the computer the contents of its buffer memory through which data containing the inputted personal code transits prior to being forwarded to the integrated circuit.

At the end of this step 40, provision can be made to inform the user that the reader is in secure mode and that the user is thus authorized to input the personal code. This information can be given, for example, by flashing a warning light on the reader and displaying a message on the display screen of the computer asking the user to input the personal code. Also, the keypad can be normally deactivated and is activated only if the authentication command is qualified by step 30 and the secure mode is activated by step 40. The specific implementation of step 40 is deemed to be readily apparent to anyone with ordinary skill in the art.

In step 50, the user inputs the personal code using the keypad of the reader. Each time an element of the personal code is inputted, provision can be made for the reader to send a signal to the computer so as to cause a neutral character to be displayed on its screen, e.g. an ASCII character such as an asterisk, informing the user about the number of inputted code elements that have been taken into account. After the personal code has been inputted, the reader proceeds with code formatting on the basis of formatting instructions that have been communicated to it by the computer. Simultaneously with the step of inputting and formatting the code, the secure mode ensures that any instruction coming from the computer during this step is compatible with keeping the reader in a secure mode.

The formatted personal code and the code authentication command are then sent by the reader to the integrated circuit of the card during a step 60. The formatted code can be integrated into the authentication command. For example, the authentication command can have the format of "Class, Code, P1, P2, P3, data", where "Class" is the type of command, "Code" is the unique code for authentication, and "Pi" are various parameters, such as length of the command. The formatted personal code forms the "data" portion of such a format.

In authentication step 70, the integrated circuit proceeds to compare the personal code it has received with the personal code of the user as pre-stored in one of the memories of the integrated circuit.

The result of this comparison is transmitted to the computer via the reader during a step 80.

The secure mode is maintained throughout steps 40 and 50 and, more generally, as long as the reader stores the inputted personal code. For greater security, the secure mode can be maintained until step 80 is completed.

The present invention is not limited to the specific embodiment described herein, and variant implementations can be applied thereto without going beyond the ambit of the invention as defined by the claims.

In particular, means can be provided on the keypad of the reader and/or the keyboard of the computer e.g. in the form of a key that enables the user to interrupt inputting of the personal code, such means being capable of being triggered at any time, and in particular during the secure mode. This effectively cancels the operation when the user realizes, before the authentication procedure has been completed, that the personal code was inputted with an error and, therefore, the authentication will inevitably produce a negative outcome. It is particularly advantageous to avoid a negative outcome for those cards that are programmed with an anti-fraud feature that keeps count of such negative outcomes and blocks use of the card after a given number is reached, such as three. This and other such variants are intended to fall within the scope of the present invention as defined by the following claims.

I claim:

1. A method of authenticating a personal code of a user of an integrated circuit card received in a reader fitted with a keypad, communicating with a computer, and capable of accepting at least one type of card, comprising:

recognizing what type of card is inserted in the reader;

transmitting formatting instructions from the computer to the reader, said instructions corresponding to the recognized type of the card;

transmitting from the computer to the reader an authentication command for use by the integrated circuit card to authenticate the personal code;

verifying that the authentication command received by the reader qualifies as a command for authenticating the personal code inputted via the keypad of the reader;

for a compliant authentication command, putting the reader into a secure mode;

receiving the personal code inputted via the keypad of the reader, and formatting the inputted personal code in accordance with said formatting instructions; and transmitting the formatted code and the authentication command from the reader to the integrated circuit card.

2. The method according to claim 1, wherein prior to inputting the personal code, informing the user that the reader is in said secure mode.

3. The method according to claim 1, wherein, subsequent to putting the reader in said secure mode, authorizing inputting of the personal code.

4. The method according to claim 1, wherein said secure mode prevents the execution of instructions that enable the computer to access the inputted personal code.

5. The method according to claim 1, wherein, simultaneously with the step of inputting and formatting the personal code, ensuring that any instruction coming from the computer during the step of inputting and formatting the personal code is compatible with keeping the reader in said secure mode.

6. The method according to claim 1, wherein, subsequent to transmitting the formatted personal code to the integrated circuit, performing in the integrated circuit of the card a comparison of the transmitted formatted personal code with the personal code of the user as pre-stored in the integrated circuit.

7. The method according to claim 6, further comprising the step of transmitting a result of the comparison from the integrated circuit to the computer via the reader.

8. The method according to claim 1, wherein the verifying step is performed in the reader.

9. A method of authenticating a personal code of a user of an integrated circuit card adapted to be received in a reader, comprising:

providing to the reader an authentication command for use by the integrated circuit card to authenticate the personal code;

verifying that the authentication command received by the reader qualifies as a command for authenticating the personal code;

responsive to verification of the authentication command, enabling input to the reader of the personal code by the user;

receiving the personal code inputted by the user to the reader; and providing the authentication command and a signal related to the inputted personal code from the reader to the integrated circuit card.

* * * * *